(12) United States Patent
Sotillo et al.

(10) Patent No.: US 11,201,967 B1
(45) Date of Patent: Dec. 14, 2021

(54) ADVANCED TELEPHONY FUNCTIONALITY FOR CHAT GROUPS IN A COMMUNICATION PLATFORM

(71) Applicant: Fuze, Inc., Boston, MA (US)

(72) Inventors: Julio Viera Sotillo, Pleasanton, CA (US); João Santos, Boston, MA (US); José Santos, Boston, MA (US); Aaron Evans, Kanata (CA)

(73) Assignee: Fuze, Inc., Boston, MA (US)

( * ) Notice: Subject to any disclaimer, the term of this patent is extended or adjusted under 35 U.S.C. 154(b) by 33 days.

(21) Appl. No.: 16/392,838

(22) Filed: Apr. 24, 2019

(51) Int. Cl.
*H04M 3/58* (2006.01)
*H04M 3/56* (2006.01)

(52) U.S. Cl.
CPC ............... *H04M 3/56* (2013.01); *H04M 3/58* (2013.01)

(58) Field of Classification Search
CPC ....................................................... H04L 12/50
USPC ............................................................ 370/329
See application file for complete search history.

(56) References Cited

U.S. PATENT DOCUMENTS

| | | | |
|---|---|---|---|
| 2004/0006595 A1* | 1/2004 | Yeh | H04L 67/36 709/204 |
| 2007/0127670 A1* | 6/2007 | Morishima | H04M 3/56 379/202.01 |
| 2012/0170726 A1* | 7/2012 | Schwartz | H04M 3/56 379/93.02 |
| 2016/0205519 A1* | 7/2016 | Patel | H04L 67/1002 455/518 |

* cited by examiner

*Primary Examiner* — Dang T Ton
(74) *Attorney, Agent, or Firm* — McDermott Will & Emery LLP

(57) ABSTRACT

A method including receiving, from a non-participant, a request to access a chat group at a voice call number, the chat group including multiple participants is provided. The method includes providing a list of the participants to the non-participant, so that the non-participant may select to talk to a first participant from the list of the participants, receiving a call, from the non-participant to the first participant, at the voice call number via a voice communication channel, and initiating a voice data transfer between the first participant and the non-participant through the voice communication channel. A system and a non-transitory, computer readable medium storing instructions to cause the system to execute the above method are also provided.

20 Claims, 7 Drawing Sheets

ADVANCED TELEPHONY FUNCTIONALITY FOR CHAT GROUPS IN A COMMUNICATION PLATFORM

BACKGROUND

Field

The present disclosure generally relates to communication platforms that provide voice, messaging, and collaboration services between multiple parties that may include local users, remote users, or cross-country and cross-continental users. More specifically, the present disclosure relates to a method for including telephony functionality features in a chat group.

Description of the Related Art

Current chat groups and other communication platforms have a less than desirable voice communication features (e.g., telephony), in addition to other advanced multimedia file sharing capabilities. This lack of voice capabilities becomes frustrating to chat participants, who may desire to share comments, opinions, or add supervisory advice to one or more other participants via a voice communication channel.

SUMMARY

In one embodiment of the present disclosure, a computer-implemented method is described that includes receiving, from a non-participant, a request to access a chat group at a voice call number, the chat group including multiple participants. The computer-implemented method also includes providing a list of the participants to the non-participant, so that the non-participant may select to talk to a first participant from the list of the participants and receiving a call, from the non-participant to the first participant, at the voice call number via a voice communication channel. The computer-implemented method also includes initiating a voice data transfer between the first participant and the non-participant through the voice communication channel.

According to one embodiment, a system is described that includes one or more processors and a memory coupled to the one or more processors, the memory including instructions that, when executed by the one or more processors, cause the one or more processors to receive, from a non-participant, a request to access a chat group at a voice call number, the chat group including multiple participants. The one or more processors also execute instructions to provide a list of the participants to the non-participant, so that the non-participant may select to talk to a first participant from the list of the participants, to receive a call, from the non-participant to the first participant, at the voice call number via a voice communication channel, and to initiate a voice data transfer between the first participant and the non-participant through the voice communication channel.

In one embodiment of the present disclosure, a computer-implemented method is described that includes selecting a participant for a chat group from a list of members registered within an organization and associating an identifier and a call number for the chat group. The computer-implemented method also includes setting telephony attributes for a voice communication within the chat group, the telephony attributes including at least one of an interactive voice response, a ring group, or a queue, associating a keypad combination for each participant in the group, and setting a response message for a request to access the chat group via a voice communication channel, based on the keypad combination for each participant.

According to one embodiment, a non-transitory, machine-readable medium is described that includes instructions, which when executed by one or more processors, cause a computer to perform a method including receiving, from a non-participant, a request to access a chat group at a voice call number, the chat group including multiple participants. The method includes providing a list of the participants to the non-participant, so that the non-participant may select to talk to a first participant from the list of the participants, receiving a call, from the non-participant to the first participant, at the voice call number via a voice communication channel, and initiating a voice data transfer between the first participant and the non-participant through the voice communication channel.

In yet another embodiment, a system is described that includes a means for storing commands and a means for executing the commands causing the system to perform a method including receiving, from a non-participant, a request to access a chat group at a voice call number, the chat group including multiple participants. The method includes providing a list of the participants to the non-participant, so that the non-participant may select to talk to a first participant from the list of the participants, receiving a call, from the non-participant to the first participant, at the voice call number via a voice communication channel, and initiating a voice data transfer between the first participant and the non-participant through the voice communication channel It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

The traditional unified communication platform solutions envision chat and voice services as two different and generally isolated features in the platform. In general, advanced voice services such as interactive voice response (IVR), Ring Groups, and Queues are pre-configured by the service provider or by an administrator in the customer's organization. Chat services, on the other hand, are more flexible in what the end users are able to customize and configure.

Embodiments as disclosed herein include solutions to bridge the gap between chat collaboration features and voice functionalities, allowing end users to add and configure telephony features to chat conversations.

To solve the problem, in some embodiments, the end user may be a participant of the conversation. The end user selects the option to enable telephony features to a particular conversation. In some embodiments, the system prompts the user to select a phone number from a list of available numbers for the user's company.

Example System Architecture

Figure 1:
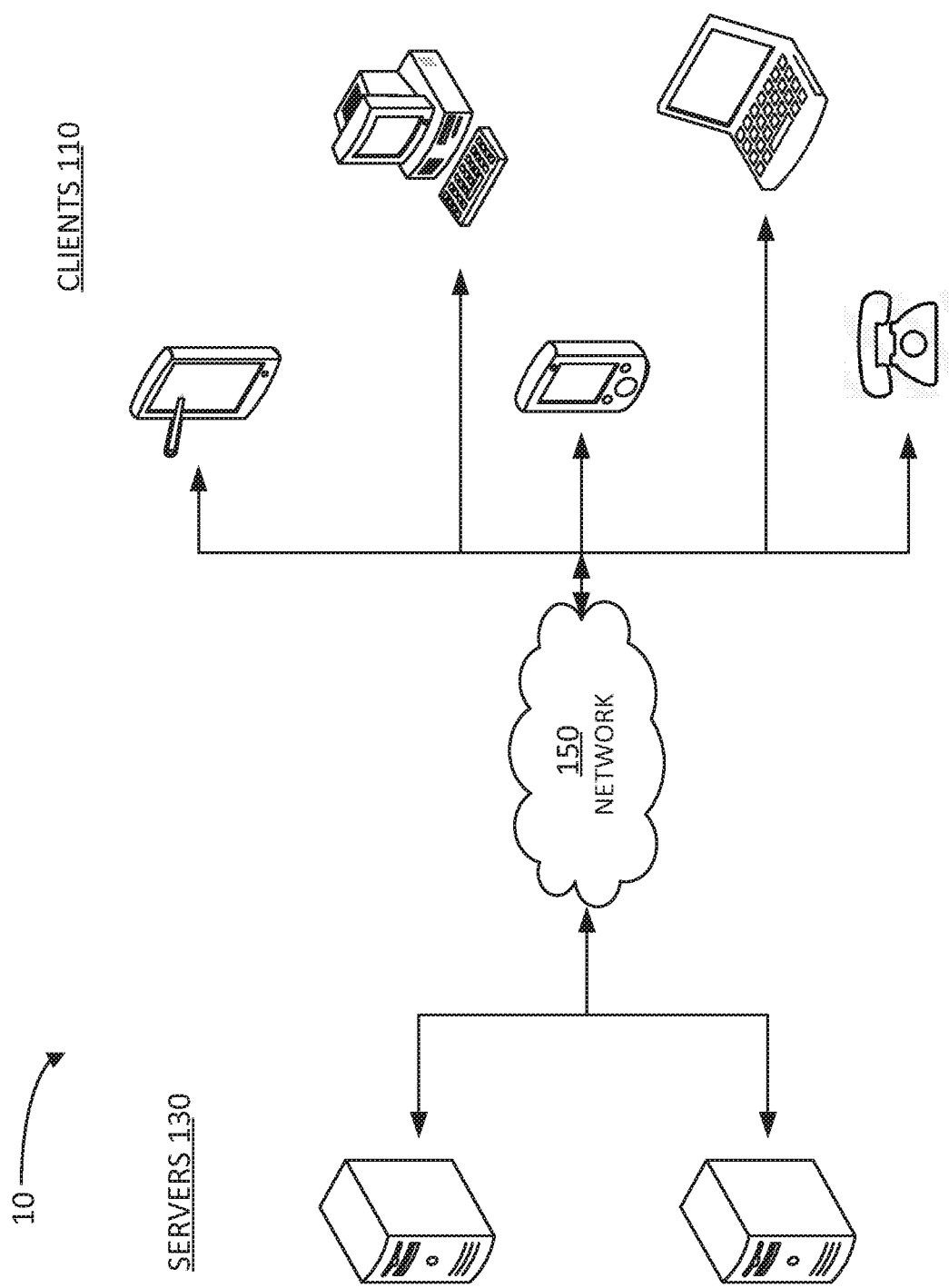
FIG. 1 illustrates an example unified communication platform using telephony functionality in chat groups, according to some embodiments.

FIG. 1 illustrates an example unified communication platform 10 using telephony functionality in chat groups, according to some embodiments. Unified communication platform 10 includes servers 130 and clients 110 connected over a network 150. One of the many servers 130 is configured to host a memory including instructions which, when executed by a processor, cause server 130 to perform at least some of the steps in methods as disclosed herein. In some embodiments, the processor in server 130 is configured to host an application for operating a unified communication network between multiple client devices 110. Further, in some embodiments, the processor in server 130 is configured to provide support for collaborative network event applications, and other networking applications such as text messaging services and the like, to a participant in the unified communication network through client device 110. Servers 130 can return images, documents, rich-text documents, and the like intended for shared use and modification by multiple participants in a presence detection system as disclosed herein. In some embodiments, servers 130 are configured to transmit voice over internet protocols (VoIP) data packets to and from one or more client devices 110. For purposes of load balancing, multiple servers 130 can host memories including instructions to one or more processors and multiple servers 130 for hosting one or more tools as disclosed herein.

Servers 130 may include any device having an appropriate processor, memory, and communications capability for hosting the documents and applications associated with the chat group engine. The chat group engine may be accessible by multiple participants through various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing the chat group engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
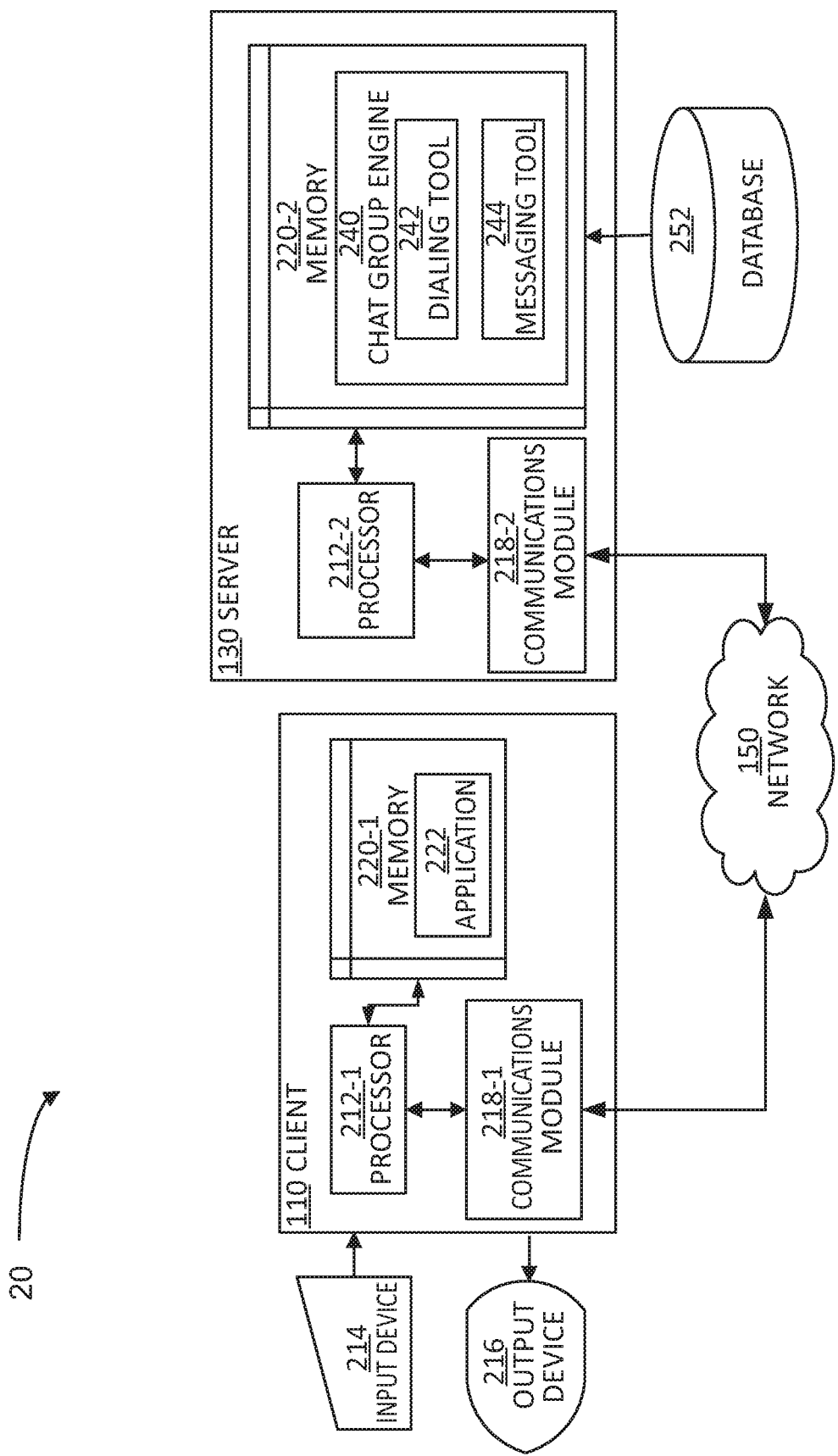
FIG. 2 is a block diagram illustrating an example server and client from the unified communication platform of FIG. 1, according to certain aspects of the disclosure.

FIG. 2 is a block diagram illustrating an example server and client device in a unified communication platform 20, according to certain aspects of the disclosure. Client device 110 and server 130 are communicatively coupled over network 150 via respective communication modules 218-1 and 218-2 (hereinafter, collectively referred to as "communication modules 218"). Communication modules 218 are configured to interface with network 150 to send and receive information, such as data, requests, responses, and commands to other devices on the network. Communications modules 218 can be, for example, modems or Ethernet cards. In some embodiments, communication modules 218 may be configured to receive and transmit voice data over a telephone network, a wireless cellular network, a data network (e.g., VoIP), or any combination of the above. In some embodiments, communication modules 218 may be configured to transmit text data between one or more participants in a chat group.

Client device 110 may be any one of a desktop computer, a laptop, or a mobile computing device. Client device 110 may include a processor 212-1 and a memory 220-1. An input device 214 and an output device 216 enable the user to interact with client device 110. Examples of input device 214 and output device 216 may include a mouse, a keyboard, a display, a touch-interactive display, and the like.

Processor 212-1 is configured to execute instructions, such as instructions physically coded into processor 212-1, instructions received from software in memory 220-1, or a combination of both. A user of client device 110 may use input device 214 to request a communication (e.g., a telephone call) with another client device 110 to chat group engine 240 via a user interface of an application 222. In addition to a text chat, or a voice communication channel, application 222 may allow participants in a chat group to exchange, present, share, and edit different types of documents. Documents shared and viewed between participants in unified communication platform 20 may include application-based documents (e.g., a text-rich document such as a Word document, a PDF document, or any other document accessible through a text editing application, including a computer code sequence, and the like), a spreadsheet document (e.g., Excel and the like), a presentation document (e.g., Power Point and the like), an XML file, an HTML file, or a multi-media file such as a video, audio, image file, or any combination of the above. In some embodiments, the request for a communication may include a telephonic conversation (e.g., direct voice communication) which may include VoIP data packets, or audio data sent over a telephone line.

Server 130 includes a memory 220-2, a processor 212-2, and a communications module 218-2. The user interface is displayed for the user in an output device 216 of client device 110. Memory 220-2 includes a chat group engine 240 and a database 252. Chat group engine 240 includes instructions which, when executed by processor 212-2, cause server 130 to perform at least partially steps as disclosed herein. In some embodiments, chat group engine 240 includes instructions to communicate with application 222 in client device 110 to establish a communication channel with one or more other client devices 110 using a dialing tool 242 and a messaging tool 244. In some embodiments, establishing the communication channel between one or more client devices 110 may include determining that one or more of client devices 110 is a subscriber of a client network of server 130. For example, in some embodiments, client device 110 having application 222 installed in memory 220-1 is a subscriber of a client network of server 130. For example, in some embodiments, participants in the chat group coordinated through chat group engine 240 may all be members of an enterprise or organization registered with server 130, or is a client of the services provided by server 130. In some embodiments, at least one of client devices 110 participating in a communication channel hosted by server 130 may not be a subscriber of a client network of server 130. For example, in some embodiments, at least one of client devices 110 participating in a communication channel may be a subscriber of a public network, and available through a telephone number.

The user may access chat group engine 240 through application 222 installed in memory 220-1 of client device 110. The user may also access chat group engine 240 via a web browser installed in client device 110, or simply by dialing a telephone number (e.g., a telephone number in database 252, or any other number registered within unified communication platform 20). Execution of application 222 may be controlled by processor 212-1. In some embodiments, application 222 is downloaded and installed by the user into client device 110, from server 130.

Figure 3:
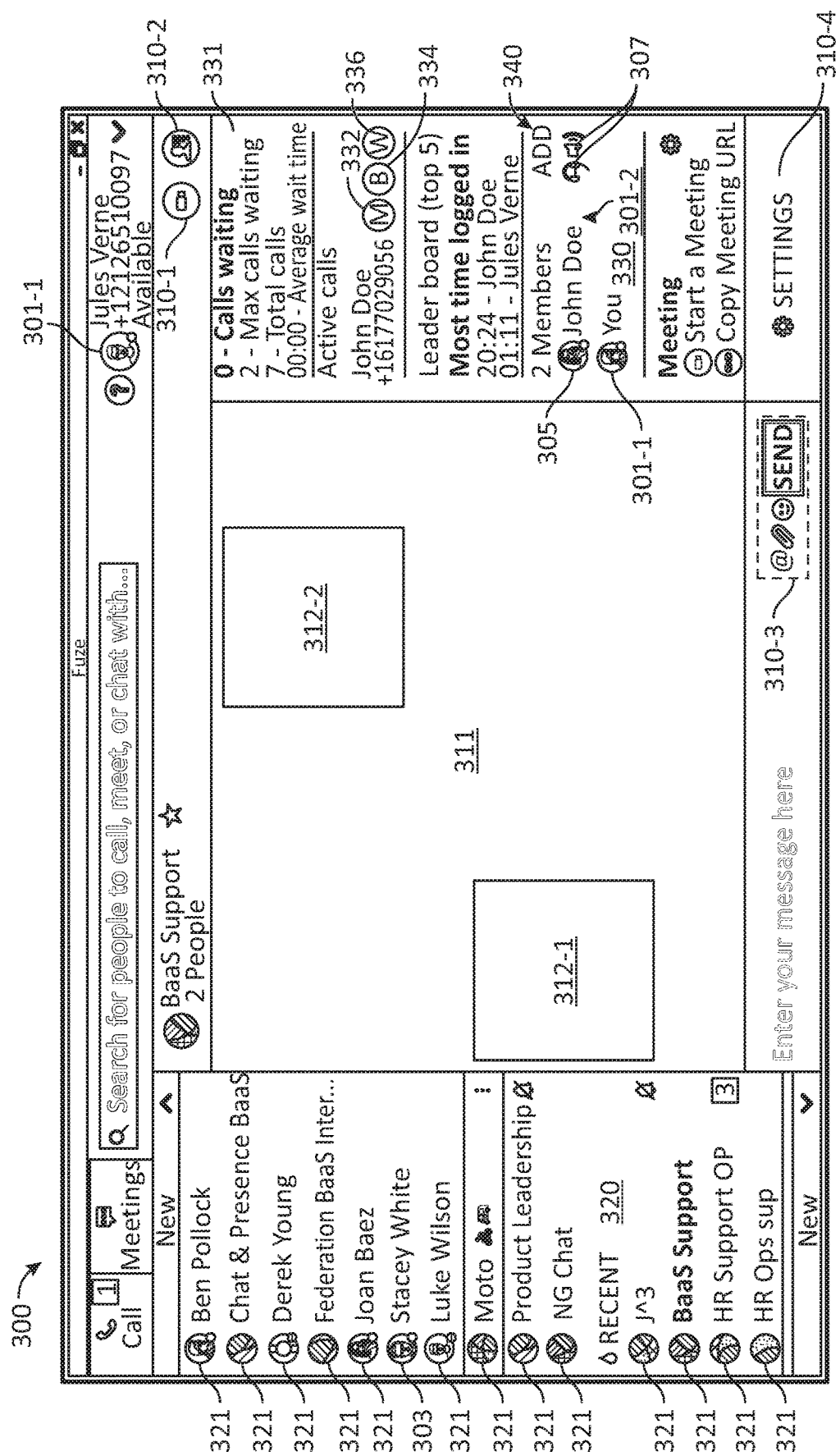
FIG. 3 illustrates an exemplary portal for a unified communication platform including voice communication in chat groups, according to some embodiments.

FIG. 3 illustrates an exemplary portal 300 for a unified communication platform including voice communication in chat groups, according to some embodiments. Portal 300 may be provided or hosted by a chat group engine in a server, and be accessed through an application installed in a client device by one of the participants 301 of a chat group 330 (e.g., server 130, chat group engine 240, client device 110, and application 222). Chat group 330 also includes other participants, such as participant 301-2. First participant 301-1 may, in some embodiments, be the creator, manager, or administrator of chat group 330, and add (or remove) a second, third, or any other participants (e.g., participant 301-2) into chat group 330 through a selector 340. Participants 301-1 and 301-2 will be hereinafter, collectively referred to as "participants 301." The number of participants 301 in chat group 330 is non-limiting. In general, chat group 330 may include more than one administrator, and at least one administrator may not be a participant 301. In an administrative role, first participant 301-1 has the ability to enable and configure voice features 307 for other participants 301. Voice features 307 may include "earphone," "speakerphone," and the like. Once chat group 330 is setup with participants 301 and has enabled voice features 307, the administrator may assign a phone number/extension to access chat group 330

Portal 300 includes a panel 320 indicating multiple service members 321, a field 311 that depicts different applications 312-1 and 312-2 (hereinafter, collectively referred to as "shared applications 312"), and a field illustrating detailed information from the chat group 330. Service members 321 may be other chat groups, or individuals, who belong to the same enterprise or organization as first participant 301-1. In some embodiments, service members 321 may include chat groups or participants from different organizations, but linked or authenticated by the chat group engine providing portal 300. In some embodiments, service members 321 may include at least one non-participant 303, who is not part of chat group 330, but nevertheless may be interested in contacting at least one of participants 301. The phone number or extension for chat group 330 may be advertised to non-participant 303 or any other service member 321 having access to the unified communication platform. In some embodiments, this includes members of the public accessing the unified communications platform via a public switched telephone network (PSTN) interconnectivity.

To illustrate with a specific example, and without limiting the scope of the present disclosure, chat group 330 may include a specific team within an organization, e.g., "Human Resources (HR) Support Group." Participants 301 include people servicing the calls/inquiries into the group, e.g., employees in the HR department. More specifically, in some embodiments chat group 330 may include the "HR Support Operations" team. Participants 301 may signal their availability to receive calls with a login state or presence state 305. Presence state 305 may include a colored dot (green for "available," yellow for "away," gray for "off line," and red for "busy/do not contact"). In some embodiments, voice features 307 may also be updated for the state and availability of hardware settings for the participant 301. For example, voice feature 307 may indicate that participant 301-2 has access to an "ear-phone," but this is de-activated (grayed out). In some embodiments, voice feature 307 may indicate that participant 301-2 has a microphone on a speaker phone.

Non-participant 303 may be a customer of chat group 330, whether internal or external to the organization, and may include one or more individuals registered within the unified communication platform. For example, non-participant 303 may include other employee in the organization that has HR questions. In some embodiments, chat group 330 may include people within the organization in charge of billing inquiries, so that non-participant 303 may include external people, such as a client or vendor for the organization. Non-participant 303 may request a service by the team included in chat group 330 and may desire to contact at least one of participants 301. To do this, non-participant 303 may initiate a call to chat group 330 simply by dialing the number directly from a phone number, or by clicking the icon for chat group 330 in panel 320. In some embodiments, the extension or phone number for chat group 330 may be included in a main menu for the organization website, e.g. as an option: "Press 1 to reach the "HR Support Operations Team."

Portal 300 is accessed by first participant 301-1 in chat group 330, and includes a video option 310-1, a user search option 310-2, chat details 310-3 such as icons for editing and adding emoticons, and configure settings 310-4 of chat group 330. Chat group 330 may include information and statistics related to the voice activity and responsiveness of the members of chat group 330, such as calls waiting 331, total calls, and average waiting time per call. This information is useful for first participant 301-1, as it may decide to exit the chat, or to call a specific participant in a one-to-one communication channel. Further, chat group 330 may display information as to specific participants in the group and their level of activity (e.g., whether they are involved in a phone call, and to which number).

In some embodiments, chat group 330 may be configured to include the features of monitor 332, barge 334, or whisper 336 in a one-to-one voice conversation between any one participant and an outside party. In the monitor feature 332, first participant 301-1 may simply listen to the conversation, without the ability to interject with a voice channel. In the barge feature 334, first participant 301-1 may in fact interject (e.g., "barge in") the conversation such that both parties in the conversation can hear the voice of first participant 301-1. In the whisper feature 336, first participant 301-1 may provide voice information only to the second participant of chat group 330 (e.g., another member of the enterprise), without being heard by the other party of the conversation (e.g. a third party outside of the enterprise).

The system keeps simple statistics about the telephony features and they are displayed within the conversation, in the field for chat group 330. The statistics displayed may vary depending on a voice mode configured for chat group 330. The type of voice mode may be configured by a first participant setting up chat group 330 (e.g., first participant 301-1), through settings 310-4. Some of the voice modes may include an interactive voice response (IVR) mode, wherein a number of calls per participant, duration of the calls, and average call duration in total and per participant are displayed in the field for chat group 330. In some embodiments, the chat group may be configured in a ring group, wherein the number of calls per participant is displayed, ranking of fastest to answer the phone and average call duration in total and per participant. In some embodiments, the chat group may be configured in a queue mode, wherein the average size of the queue, the calls per participant, and the average call duration in total and per participant is detailed in the field for chat group 330.

Figure 4:
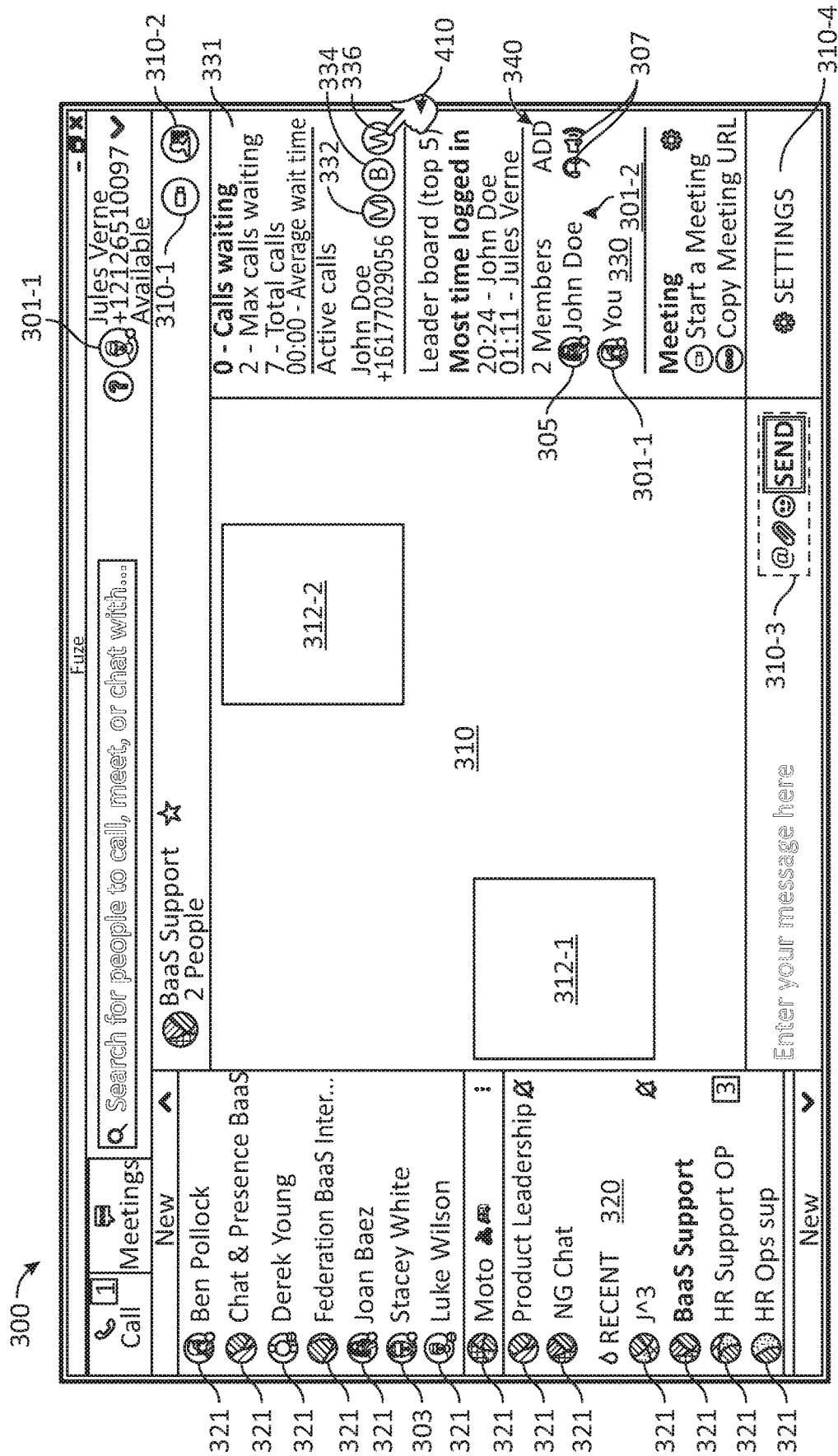
FIG. 4 illustrates a portal as in FIG. 3, activating one telephony function (e.g., whisper feature 336), according to some embodiments.

FIG. 4 illustrates portal 300 activating one telephony function (e.g., whisper feature 336), according to some embodiments. Accordingly, a telephony function for whisper mode 336 is selected by first participant 301-1 using cursor 410. As described above, portal 300 includes panel 320 indicating multiple service members 321, field 311 depicting shared applications 312, chat group 330, and associated information such as calls waiting 331 and telephony features such as monitor feature 332, barge feature 334, and whisper feature 336.

In some embodiments, the participant may include an agent or an employee being supervised whose telephone conversation is being tapped into by a supervisor, e.g., the participant's phone number and potentially a display with information about the supervisor or "whispering" party. In whisper mode 336, first participant 301-1 (e.g., a supervisor) may be able to listen to the conversation between the second participant (e.g., agent or employee) and the third party, and further provide voice comments to the second participant. In the whisper mode 336, the third party is unable to listen to first participant 301-1.

Figure 5:
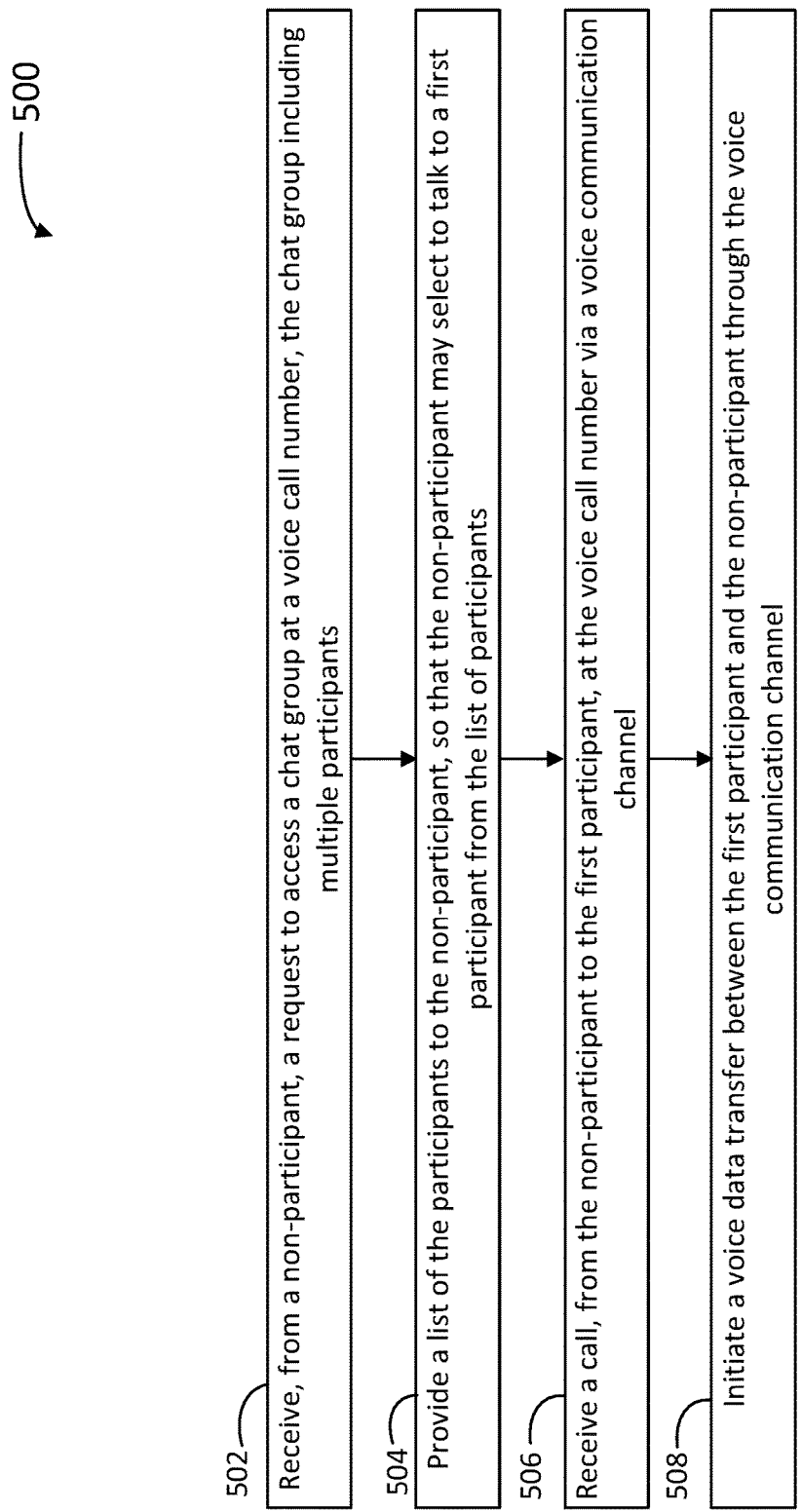
FIG. 5 is a flowchart illustrating steps in a method for managing a chat group with added telephony functionality, according to some embodiments.

FIG. 5 is a flowchart illustrating steps in a method 500 for managing a chat group with added telephony functionality, according to some embodiments. Method 500 may be performed at least partially by any one of the network servers hosting a chat group engine (e.g., chat group engine 240), while communicating with any one of a plurality of client devices in a unified communication platform (e.g., servers 130 and clients 110 in unified communication platforms 10 and 20). In some embodiments, the unified communication platform provides access, for a non-participant, to a chat group (e.g., chat group 330) between multiple participants. In some embodiments, method 500 includes providing a voice communication channel (e.g., via telephony) between the non-participant and at least one of the participants in a chat group. At least some of the steps in method 500 may be performed by a computer having a processor executing commands stored in a memory of the computer (e.g., processors 212 and memories 220). For example, at least some of the commands may be included in an application installed in a client device accessible by a user (e.g., application 222). In some embodiments, the application may be hosted by a chat group engine stored in the server memory (e.g., chat group engine 240 in memory 220-2). The chat group engine may include a dialing tool and a messaging tool (e.g., memory 220-2, chat group engine 240, dialing tool 242, and messaging tool 244). Further, steps as disclosed in method 500 may include retrieving, editing, and/or storing information about multiple chat participants in a database that is part of, or is communicably coupled to, the computer (e.g., database 252). Methods consistent with the present disclosure may include at least some, but not all, of the steps illustrated in method 500, performed in a different sequence. Furthermore, methods consistent with the present disclosure may include at least two or more steps as in method 500 performed overlapping in time, or almost simultaneously.

Step 502 includes receiving, from a non-participant, a request to access the chat group, the chat group including multiple participants. In some embodiments, step 502 includes dialing the voice call number for a ring group reaching all participants in the chat group. In some embodiments, step 502 includes dialing the voice call number and accessing a queue to answer the voice call number, the queue including one or more participants selected from the participants in the chat group. In some embodiments, step 502 includes providing, to the non-participant, a voice call number for the chat group.

Step 504 includes providing a list of the participants to the non-participant, so that the non-participant may select to talk to a first participant from the list of participants. In some embodiments, step 504 includes prompting the non-participant, upon the request to activate the voice call number, to select one of the multiple participants in the chat group based on a keypad allocation for each of the participants. In some embodiments, step 504 includes adding a statistical information for at least one participant in the list. In some embodiments, step 504 includes adding the statistical information based on a mode of the communication channel established between the first participant and the non-participant (e.g., text message, earphone, speaker phone, videophone and the like). In some embodiments, step 504 includes providing a status of at least one participant in the list. In some embodiments, step 504 includes providing a number of calls per participant, and an average call duration per participant and per chat group. In some embodiments, step 504 includes ranking the participants according to a time to answer a call, and an average call duration in total and per participant. In some embodiments, step 504 includes providing an average size of a queue of non-participants trying to access the chat group, or each of the participants in the chat group.

Step 506 includes receiving a call, from the non-participant to the first participant, at the voice call number via a voice communication channel.

Step 508 includes initiating a voice data transfer between the first participant and the non-participant through the voice communication channel. In some embodiments, step 508 includes bridging a call between the non-participant and the first participant. In some embodiments, step 508 includes receiving a request from a second participant in the chat group for at least one of barging, listening, or whispering on a conversation involving the first participant and the non-participant. In some embodiments, step 508 includes updating statistics information for each of the participants of the chat group based on the voice data transfer between the non-participant and the first participant.

Figure 6:
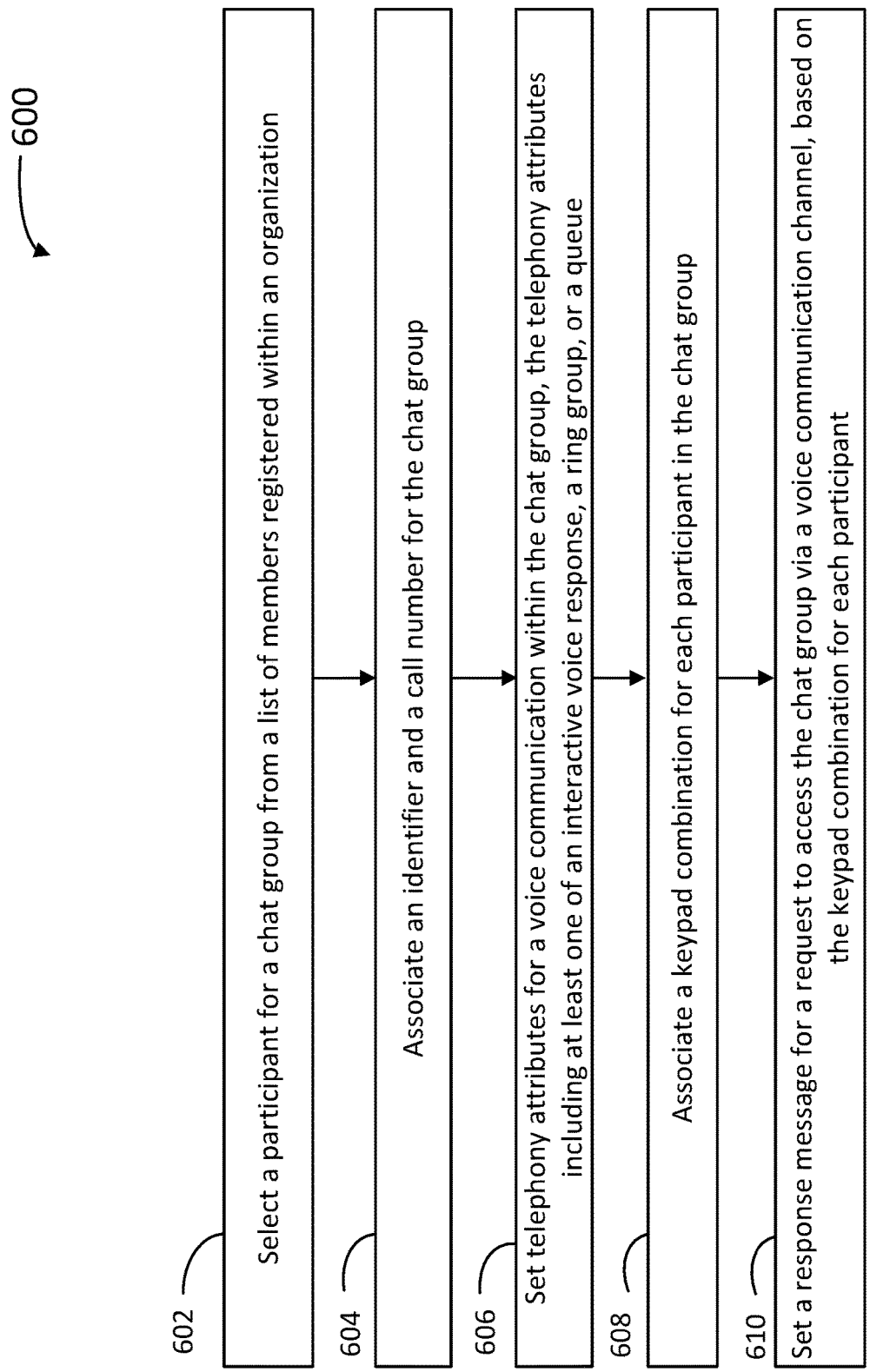
FIG. 6 is a flowchart illustrating steps in a method for configuring a chat group with added telephony functionality, according to some embodiments.

FIG. 6 is a flowchart illustrating steps in a method for configuring a chat group with added telephony functionality, according to some embodiments. Method 600 may be performed at least partially by any one of the network servers hosting a chat group engine (e.g., chat group engine 240), while communicating with any one of a plurality of client devices in a unified communication platform (e.g., servers 130 and clients 110 in unified communication platforms 10 and 20). At least some of the steps in method 600 may be performed by a computer having a processor executing commands stored in a memory of the computer (e.g., processors 212 and memories 220). For example, at least some of the commands may be included in an application installed in a client device accessible by a user (e.g., application 222). In some embodiments, the application may be hosted by a chat group engine stored in the server memory (e.g., chat group engine 240 in memory 220-2). The chat group engine may include a dialing tool and a messaging tool (e.g., memory 220-2, chat group engine 240, dialing tool 242, and messaging tool 244). Further, steps as disclosed in method 600 may include retrieving, editing, and/or storing information about multiple chat participants in a database that is part of, or is communicably coupled to, the computer (e.g., database 252). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes selecting a participant for a chat group from a list of members registered within an organization.

Step 604 includes associating an identifier and a call number for the chat group. In some embodiments, step 604 includes publishing the phone number or extension that will direct calls to the chat group. In some embodiments, step 604 includes enabling voice features, and assigning the phone number or extension to the chat group automatically, through a corporate directory and/or auto-attendant or interactive voice response (IVR) self-service menu for external callers.

Step 606 includes setting telephony attributes for a voice communication within the group. The telephony attributes may include at least one of an interactive voice response, a ring group, or a queue. In some embodiments, step 606 may include setting an IVR telephony mode, wherein a caller dials the conversation phone number, and the system will automatically pick up the call. In the IVR mode, step 606 includes prompting the caller to use the keypad of the telephone to forward the call to one of the participants of the conversation. Further, in some embodiments, step 606 includes automatically assigning a number of a keypad to each participant in the chat group. Also, in some embodiments, step 606 includes using text-to-speech conversion algorithms to announce the names of the participants in the chat group. When the caller presses the corresponding keypad number, step 606 includes forwarding the call to the corresponding participant. In some embodiments, step 606 may include setting the chat group in a ring group configuration, wherein all the available participants' phones will ring at the same time when a third party calls, and the first chat group participant to pick up the call gets the call connected. In some embodiments, the availability of the participants may be determined by the user's presence on the chat application. In some embodiments, step 606 includes setting the chat group in a queue configuration, wherein when a caller dials a chat group number, the call is placed on a queue and the calls will be evenly distributed among the conversation participants.

Step 608 includes associating a keypad combination for each participant in the group.

Step 610 includes setting a response message for a request to access the chat group via a voice communication channel. The response message may be based on the keypad combination for each participant. In some embodiments, step 610 includes setting the response message based on the name of the participant using a text-to-speech technology. In some embodiments, step 610 includes removing the voice features from the chat group, upon a participant's decision.

Hardware Overview

Figure 7:
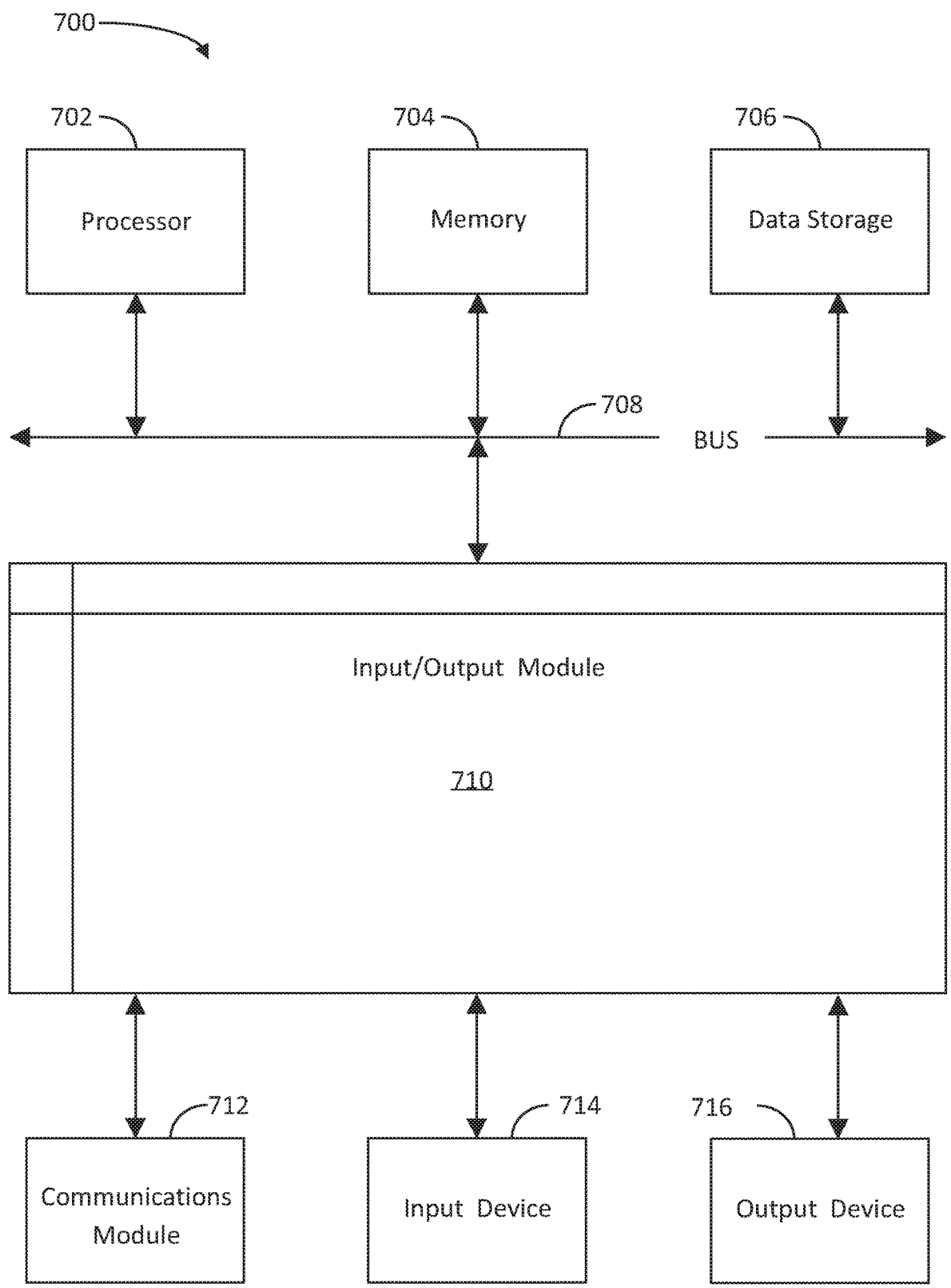
FIG. 7 is a block diagram illustrating an example computer system with which the client and server of FIGS. 1-3, and the methods of FIGS. 5 and 6 can be implemented, according to some embodiments.

FIG. 7 is a block diagram illustrating an exemplary computer system 700 with which the client device 110 and server 130 of FIGS. 1-2, and the methods of FIGS. 5 and 6 can be implemented. In certain aspects, the computer system 700 may be implemented using hardware or a combination of software and hardware, either in a dedicated server, or integrated into another entity, or distributed across multiple entities.

Computer system 700 (e.g., client device 110 and server 130) includes a bus 708 or other communication mechanism for communicating information, and a processor 702 (e.g., processors 212) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, a code that creates an execution environment for the computer program in question, e.g., code that constitutes processor firmware, a protocol stack, a database management system, an operating system, or a combination of one or more of them stored in an included memory 704 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, a special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well-known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communication modules 712 (e.g., communication modules 218-1 and 218-2) include networking interface cards, such as Ethernet cards and modems. In certain aspects, input/output module 710 is configured to connect to a plurality of devices, such as an input device 714 (e.g., input device 214) and/or an output device 716 (e.g., output device 216). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices, such as an LCD (liquid crystal display) monitor, for displaying information to the user.

According to one aspect of the present disclosure, client device 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communication modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship with each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that include bus 708. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   receiving, from a non-participant, a request to access a chat group at a voice call number, the chat group including multiple participants, comprising at least one of a barging mode request, a listening mode request, and a whispering mode request on a conversation involving the non-participant;
   providing a list of the participants to the non-participant, to allow the non-participant to talk to a first participant from the list of the participants;
   receiving a call, from the non-participant to the first participant, at the voice call number via a voice communication channel;
   selecting, by the first participant, to add a second participant to the call;
   initiating a voice data transfer between the first participant and the non-participant through the voice communication channel;
   and
   initiating, in a whispering mode, a whisper data transfer between the first participant and the second participant, wherein the non-participant is blocked from the whisper data transfer while receiving the voice data transfer from the first participant.

2. The computer-implemented method of claim 1, further comprising dialing the voice call number for a ring group reaching all participants in the chat group.

3. The computer-implemented method of claim 1, further comprising dialing the voice call number and accessing a queue to answer the voice call number, the queue including one or more participants selected from the participants in the chat group.

4. The computer-implemented method of claim 1, further comprising prompting the non-participant, upon the request to activate the voice call number, to select one of the multiple participants in the chat group based on a keypad allocation for each of the participants.

5. The computer-implemented method of claim 1, wherein providing the list to the non-participant further comprises including a statistical information for at least one participant in the list.

6. The computer-implemented method of claim 1, wherein providing the list to the non-participant further comprises providing a status of at least one participant in the list.

7. The computer-implemented method of claim 1, wherein providing the list to the non-participant further comprises providing a number of calls per participant, and an average call duration per participant and per chat group.

8. The computer-implemented method of claim 1, wherein providing the list to the non-participant further comprises ranking the participants according to a time to answer the request to activate the voice call number and an average call duration in total and per participant.

9. The computer-implemented method of claim 1, wherein providing the list to the non-participant further comprises providing an average size of a queue of participants answering the request to activate the voice call number.

10. The computer-implemented method of claim 1, further comprising removing the voice communication channel for at least one participant upon request.

11. The computer-implemented method of claim 1, wherein in a barging mode the computer-implemented method includes allowing the non-participant to interject in a conversation between the first participant and the second participant, wherein the first participant and the second participant hear a voice of the non-participant.

12. A system comprising:
one or more processors; and
a memory coupled to the one or more processors, the memory including instructions that, when executed by the one or more processors, cause the one or more processors to:
receive, from a non-participant, a request to access a chat group at a voice call number, the chat group including multiple participants, comprising at least one of a barging mode request, a listening mode request, and a whispering mode request on a conversation involving the non-participant;
provide a list of the participants to the non-participant, to allow the non-participant may select to talk to a first participant from the list of the participants;
receive a call, from the non-participant to the first participant, at the voice call number via a voice communication channel;
select, by the first participant, to add a second participant to the call;
initiate a voice data transfer between the first participant and the non-participant through the voice communication channel;
and
initiate, in a whispering mode, a whisper data transfer between the first participant and the second participant, wherein the non-participant is blocked from the whisper data transfer while it receives the voice data transfer from the first participant.

13. The system of claim 12, wherein the one or more processors further execute instructions to at least one of:
set the voice call number for a ring group reaching all participants in the chat group when activating the voice call number; and
set the voice call number for accessing a queue to answer the voice call number, the queue including one or more participants selected from the participants in the chat group.

14. The system of claim 12, wherein the one or more processors further execute instructions to prompt the non-participant, upon the request to activate the voice call number, to select one of the multiple participants in the chat group based on a keypad allocation for each of the participants.

15. The system of claim 12, wherein to provide the list of the participants to the non-participant, the one or more processors further execute instructions to include a statistical information for at least one participant in the list of the participants.

16. The system of claim 12, wherein to provide the list of the participants to the non-participant, the one or more processors further executes instructions to rank the participants according to a time to answer the request to activate the voice call number and an average call duration in total and per participant.

17. A non-transitory, computer-readable medium storing instructions which, when executed by a processor, cause a computer to perform a method, the method comprising:
receiving, from a non-participant, a request to access a chat group at a voice call number, the chat group including multiple participants, comprising at least one of a barging mode request, a listening mode request, and a whispering mode request on a conversation involving the non-participant;
providing a list of the participants to the non-participant, to allow the non-participant to talk to a first participant from the list of the participants;
receiving a call, from the non-participant to the first participant, at the voice call number via a voice communication channel;
selecting, by the first participant, to add a second participant to the call;
initiating a voice data transfer between the first participant and the non-participant through the voice communication channel;
and
initiating, in a whispering mode, a whisper data transfer between the first participant and the second participant, wherein the non-participant is blocked from the whisper data transfer while receiving the voice data transfer from the first participant.

18. The non-transitory, computer-readable medium of claim 17, wherein the method further comprises:
setting the voice call number for a ring group reaching all participants in the chat group when activating the voice call number; and
setting the voice call number for accessing a queue to answer the voice call number, the queue including one or more participants selected from the participants in the chat group.

19. The non-transitory, computer-readable medium of claim 17, wherein the method further comprises prompting the non-participant, upon the request to activate the voice call number, to select one of the multiple participants in the chat group based on a keypad allocation for each of the participants.

20. The non-transitory, computer-readable medium of claim 17 wherein, in the method, providing the list of the participants to the non-participant further comprises including a statistical information for at least one participant in the list of the participants.

* * * * *